(12) United States Patent
Erlich et al.

(10) Patent No.: US 10,625,188 B2
(45) Date of Patent: Apr. 21, 2020

(54) SUBMERSIBLE WATER FILTRATION APPARATUS WITH MULTI-STAGE FILTRATION

(71) Applicant: Water Tech, LLC, East Brunswick, NJ (US)

(72) Inventors: Guy Erlich, Monroe Township, NJ (US); John Many, Myrtle Beach, SC (US); Jon Elmaleh, Brooklyn, NY (US); Curtis Elliott, Washington, NJ (US); Daniel Camisi, Tabernacle, NJ (US); Thomas Lorys, Linden, NJ (US); James Kosmyna, Long Pond, PA (US)

(73) Assignee: Water Tech, LLC, East Brunswick, NJ (US)

( * ) Notice: Subject to any disclaimer, the term of this patent is extended or adjusted under 35 U.S.C. 154(b) by 0 days.

(21) Appl. No.: 16/108,837

(22) Filed: Aug. 22, 2018

(65) Prior Publication Data
US 2020/0061502 A1    Feb. 27, 2020

(51) Int. Cl.
*B01D 35/26* (2006.01)
*B01D 29/23* (2006.01)
*E04H 4/12* (2006.01)

(52) U.S. Cl.
CPC ............. *B01D 35/26* (2013.01); *B01D 29/23* (2013.01); *B01D 2201/202* (2013.01); *E04H 4/1209* (2013.01)

(58) Field of Classification Search
CPC .. B01D 35/26; B01D 29/23; B01D 2201/202; E04H 4/1209

USPC ..... 210/167.1, 167.16, 167.17, 416.1, 416.2; 15/1.7
See application file for complete search history.

(56) References Cited

U.S. PATENT DOCUMENTS

| | | | |
|---|---|---|---|
| 3,961,393 A | 6/1976 | Pansini | |
| 4,962,559 A * | 10/1990 | Schuman | E04H 4/1618 15/1.7 |
| 5,122,285 A | 6/1992 | Tartal | |
| 5,546,982 A | 8/1996 | Clark et al. | |
| 5,720,068 A | 2/1998 | Clark et al. | |
| 5,891,333 A | 4/1999 | Ferguson | |
| 6,001,249 A | 12/1999 | Bailey et al. | |
| 6,423,217 B1 | 7/2002 | Campbell et al. | |
| 6,797,157 B2 | 9/2004 | Erlich | |
| 6,811,687 B2 | 11/2004 | Illingworth | |
| 6,878,266 B2 | 4/2005 | Leaverton | |
| 9,091,092 B1 | 7/2015 | Hui et al. | |
| 9,453,355 B1 * | 9/2016 | Rasp | E04H 4/1645 |
| 9,982,452 B2 | 5/2018 | Hui et al. | |
| 2005/0279683 A1 * | 12/2005 | Erlich | E04H 4/1636 210/167.16 |
| 2006/0265820 A1 * | 11/2006 | Erlich | E04H 4/1636 15/1.7 |

(Continued)

*Primary Examiner* — Fred Prince
(74) *Attorney, Agent, or Firm* — Husch Blackwell LLP

(57) ABSTRACT

An integrated process and system for the cleaning of any body of water in need of periodic cleaning, including but not limited to a swimming pool or spa. A submersible water filtration apparatus comprises a housing unit, an impeller driven by an electric motor powered by batteries, an inlet where fluid, such as water, is drawn inwards into the submersible water filtration apparatus, an outlet for returning filtered water into the body of water, and at least one filter zone.

4 Claims, 14 Drawing Sheets

(56) References Cited

U.S. PATENT DOCUMENTS

2016/0032604 A1\* 2/2016 Chen .................... E04H 4/1636
                                                   210/167.16

\* cited by examiner

SUBMERSIBLE WATER FILTRATION APPARATUS WITH MULTI-STAGE FILTRATION

FIELD OF THE INVENTION

The present invention relates to a submersible water filtration apparatus, and more specifically to a water filtration apparatus for direct submersion into a body of water to be filtered, and having a user accessible multi-stage filtration system which allows for user selection and replacement of different filter configurations based on types and size of debris in the body of water.

BACKGROUND OF THE INVENTION

Manually operated submersible water filtration apparatuses, such as pool cleaners, many of which use suctional forces to clean bodies of water in need of periodic cleaning—such as swimming pools or spas—generally take the form of hand-held cleaning devices and/or extension pole driven cleaning devices. Both are fairly inexpensive and suitable for cleaning smaller sized bodies of water, such as swimming pools and spas. Other types of pool cleaning devices, such as self-propelled robotic pool cleaners, are often more appropriate for larger volume swimming pools and spas. Although very popular for use at residential pools, the manually driven pool and spa cleaners can have various limitations.

For example, some extension pole operated pool cleaners require a hose line connected to a pool's external filtration system to provide the suctional forces to clean the pool. These types of manually operated pool cleaners are not self-contained units. Often, such prior art devices also require installation of specially designed connector(s) to the pool's external pump at an additional expense. Users often become frustrated during use because the hose line is dragged around the pool during cleaning, which subjects it to being tangled and/or damaged.

Alternatively, some manually operated pool cleaner designs include on-board batteries to provide the necessary suction power to clean the pool or spa. The battery operated pool cleaners have the advantage of eliminating the need for the hose line from the pool's filtration system. However, these units can be prone to leaking, which can ruin the battery/motor and render the product inoperable. For example, the electrical contacts used to charge such units will often rust in the presence of only a slight amount of moisture. Also, the suctional flow at the inlet of the pool cleaner may be less powerful than the above-mentioned pool side filtration cleaners, especially when the battery power is running low. Moreover, the batteries will eventually require replacement or recharging. The longevity of operation of many prior art devices can be as little as thirty minutes before running out of battery power, which in many cases is insufficient for a user to clean larger sized pools.

Still other drawbacks can occur when changing or cleaning the filters of prior art pool cleaners. This task can be difficult and/or awkward, often requiring several steps, including: grabbing and pulling the hose line coupled to the cleaning unit and then opening the unit to access the filter. However, when the unit is open, the user can be splashed with dirty water and/or debris may be spilled back into the pool.

Additionally, swimming pools often contain both large debris such as leaves and small debris such as dirt, insects, and the like. Most pools therefore require a cleaner capable of filtering out various sizes of debris. Most cleaners of the prior art employ only a single filter. Depending on its size, a single filter can easily become clogged or blocked by large debris such as leaves. Filtration blockage can cause a loss of pressure downstream of filtration where the impeller or propeller (hereinafter collectively referred to as an "impeller") is often located, which can result in a loss of suction and an inability to pick up debris. Similarly, for cleaners with the impeller before or upstream of filtration, the increase in back pressure will prevent flow across the impeller, which similarly causes a loss in suction at the inlet. Such blockages often require the user to remove the blockages by changing or cleaning out the filter during the middle of the cleaning process, which can be time consuming. Additionally, blockages can cause undesirable strain on the motor, which can shorten the lifespan of the cleaner.

It is therefore desirable for a pool cleaner to allow for a quick and easy setup without the need to connect any hoses, as well as maintain the capability to clean the pool surface swiftly under the guidance of the user. It is also an objective of the present invention to have a filter chamber that is easy to remove and clean without the risk of the user getting wet or dirty from the debris collected.

A further objective is to incorporate a design feature that applies fluid dynamics principles to reduce the flow resistance on the impeller and therefore reduce current draw from the power source (e.g., the on-board battery). This will increase the runtime of the battery.

Therefore, it is desirable to provide a submersible water filtration apparatus that is capable of housing multiple interchangeable filters simultaneously so that the user can select from a set of differently configured filters. Certain filters may be best suited for cleaning an entire pool in one continuous process, depending on the types of debris commonly found in a given body of water. Accordingly, the user is provided with a wide selection of filters to use. Each is designed for particular types of debris so that no matter what debris is in the body of water, the body of water can be cleaned with ease.

SUMMARY OF THE INVENTION

The present invention is directed to an integrated process and system for the cleaning of any body of water in need of periodic cleaning, including but not limited to a swimming pool or spa. In general, a submersible water filtration apparatus, which may be a pool cleaner in a non-limiting example, comprises a housing unit, an impeller driven by an electric motor powered by batteries, an inlet where fluid, such as water, is drawn inwards into the submersible water filtration apparatus, an outlet for returning filtered water into the body of water, and at least one filter zone. For the purposes hereof, it will be understood that discussion of one or more pool cleaner embodiments herein are relevant to a generalized submersible water filtration apparatus as well. Similarly, discussion of filtering water in a pool herein will be understood as being relevant to generalized water filtration in any body of water in need of periodic cleaning as well.

It is the object of this invention to create a submersible battery powered pool cleaner that is designed for efficiency and therefore runtime by utilizing a flow conditioning element designed to reduce current usage. In an example embodiment, the invention establishes pre-swirling of the water flow before it reaches the impeller, whereby the drag that is created on the impeller can be reduced, and therefore the current draw from the battery is also reduced. This decrease in current draw improves the overall runtime of the cleaner. In another embodiment, exhaust flow is recirculated to outside the inlet. This recirculated flow adds kinetic energy to the inlet flow which reduces the energy needed from the impeller.

Additionally, the filter chamber can be easily removed and cleaned, allowing the user to swap out or rearrange the multistage filtration components.

Accordingly, one object of this invention is to provide a submersible pool cleaner for filtering water in a pool that includes: a housing, a filter unit, an electric motor, an outlet, a battery, an optional vacuum head, and at least one flow conditioning element, including but not limited to a pre-swirl mechanism. The filter unit includes a housing defining therein a chamber for removably receiving and holding one or more water filters. The housing includes a water inlet. The electric motor is coupled to an impeller mounted at least partially within the housing to pump water from the inlet into and eventually out from the housing. The battery is mounted in the housing and is electrically connectable to the electric motor for powering the motor. The at least one flow conditioning element modifies the flow of water in a way that will reduce energy used by the impeller, and therefore the battery.

BRIEF DESCRIPTION OF DRAWINGS

The foregoing summary, as well as the following detailed description will be best understood when read in conjunction with the attached drawings in which the same or similar elements are referred to by the same numerals, and where.

DETAILED DESCRIPTION OF THE PREFERRED EMBODIMENTS

Figure 1:
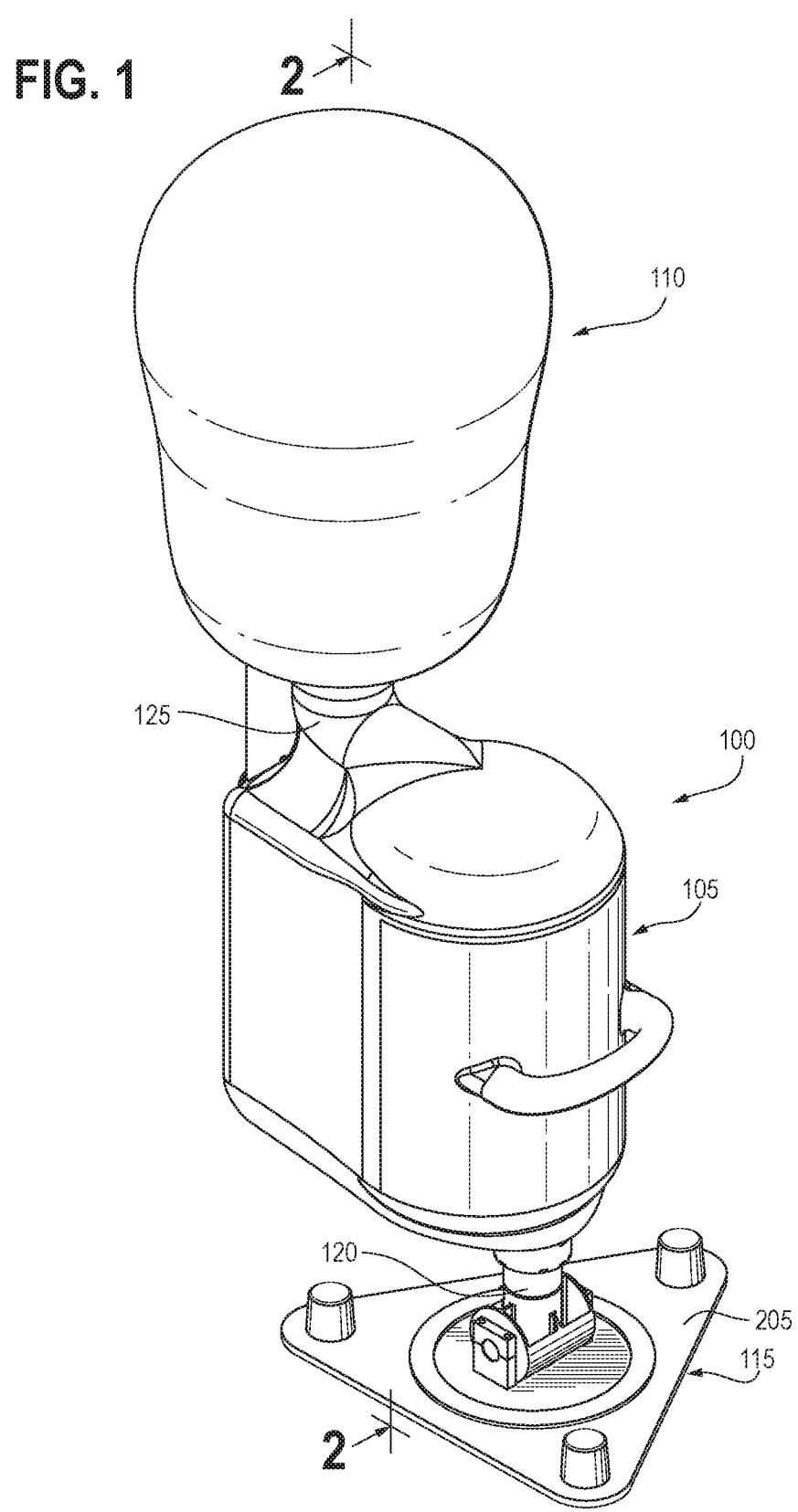
FIG. 1 is a top, front perspective view of a first embodiment of a manually operated pool cleaner.

In a first example embodiment shown in FIG. 1, a submersible pool cleaner 100 comprises a filter unit 105, a filter bag 110, and a vacuum head 115. A filter unit inlet 120 of the filter unit selectively engages with the vacuum head 115 for vacuuming debris thereunder, as will be discussed below. It will be understood that the vacuum head 115 may take any form, and that the form illustrated in FIG. 1 is merely an example. The flow of water is directed through the filter unit 105 and out an outlet 125 of the filter unit into the filter bag 110. As shown in FIG. 1, filter bag 110 may be an after-impeller filter to filter any debris that makes it through the filter unit 105. However, other positions of a filter bag 110 are envisioned, as discussed below. Filter bag 110 can be used with or without filters in filter unit, or not at all.

Figure 2:
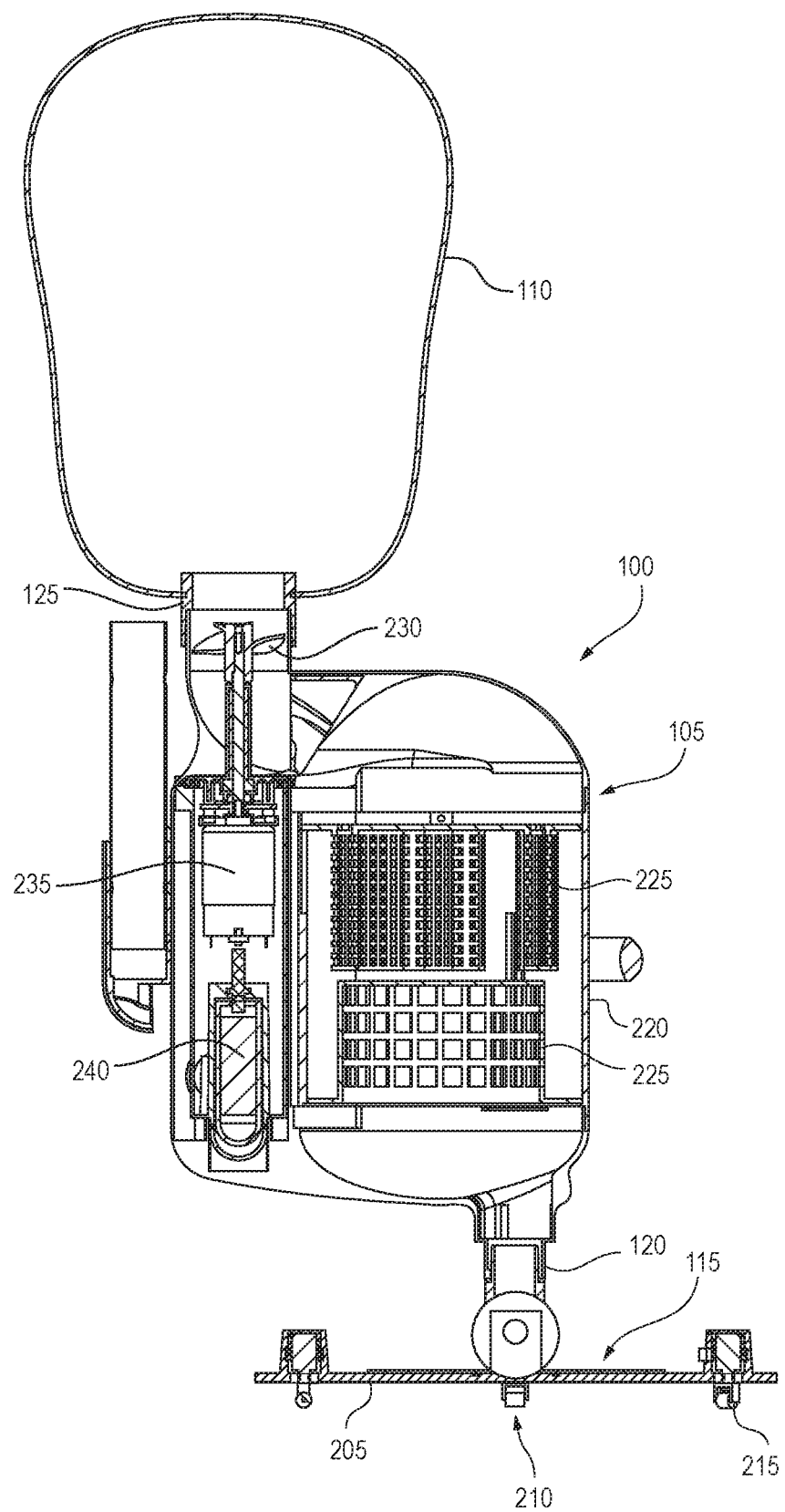
FIG. 2 is a side elevational cross-sectional view of the pool cleaner of FIG. 1.

FIG. 2 illustrates a cross-sectional view of the pool cleaner 100 of FIG. 1. As can be seen, vacuum head 115 may include a body 205 extending outwardly from a vacuum head inlet 210. The body 205 may be triangular in shape, although other shapes are envisioned, and may be formed from a rigid or a flexible material or a combination thereof. One or more wheels 215 may extend from the body 205 from positions spaced outwardly from the vacuum head inlet 210 to allow for easy rolling of the pool cleaner 100 along a pool surface. In operation, water and/or debris are drawn through the vacuum head inlet 210 into the filter unit inlet 120 of the filter unit 105. The filter unit inlet 120 may be directly engaged with the vacuum head inlet 210, or an additional engagement structure may be provided on the vacuum head 115 for engagement with the filter unit inlet 120. As a non-limiting example, the filter unit inlet 120 may be pivotally connected to the vacuum head 115. A pivoting structure would allow the vacuum head 115 to stay generally parallel to the pool surface, while allowing the rest of the pool cleaner 100 to be angled according to the positioning of the user.

Once drawn through the vacuum head inlet 210 and the filter unit inlet 120, water and/or debris enters the housing 220 of the filter unit 105. Within the housing 220, zero, one, or more than one filter 225 may be used. As shown in FIG. 2, two or more sequential filters 225 with decreasing porosity or increasing filtration capabilities may be used. Filter options and structures will be discussed in detail below. After passing through zero, one, or more than one filter 225, water and any remaining fine debris may pass through the outlet 125 of filter unit 105 and into the filter bag 110. Filter bag 110 may be woven out of various known materials including but not limited to microfiber, and may have multiple designs and sizes for filtering different sizes, types, and capacities of debris. In the embodiment shown in FIG. 2, the filter bag 110 would not need to hold as much debris, as only fairly small debris would likely be able to pass through filters 225. Therefore, the filter bag 110 in this embodiment may not need a large volume. Similarly, when filtering fine debris is desirable, a microfiber with a small pore size may be used. However, other sizes and materials are envisioned, depending on the pre-filtering used in the filter unit 105.

An impeller 230 may be positioned in or at least partially within the housing 220. A motor 235, which is preferably an electric motor, is mechanically connected to the impeller 230 for driving the impeller 230 during use. Such mechanical connection may be accomplished with gearing, a drive shaft, a drive chain, or any other structure known in the art. One or more than one battery 240, which may be rechargeable, is electrically connected to the motor 235 for providing power to the motor 235. Collectively, battery 240, motor 235, and impeller 230 form a water pump within the pool cleaner 100.

Figure 3:
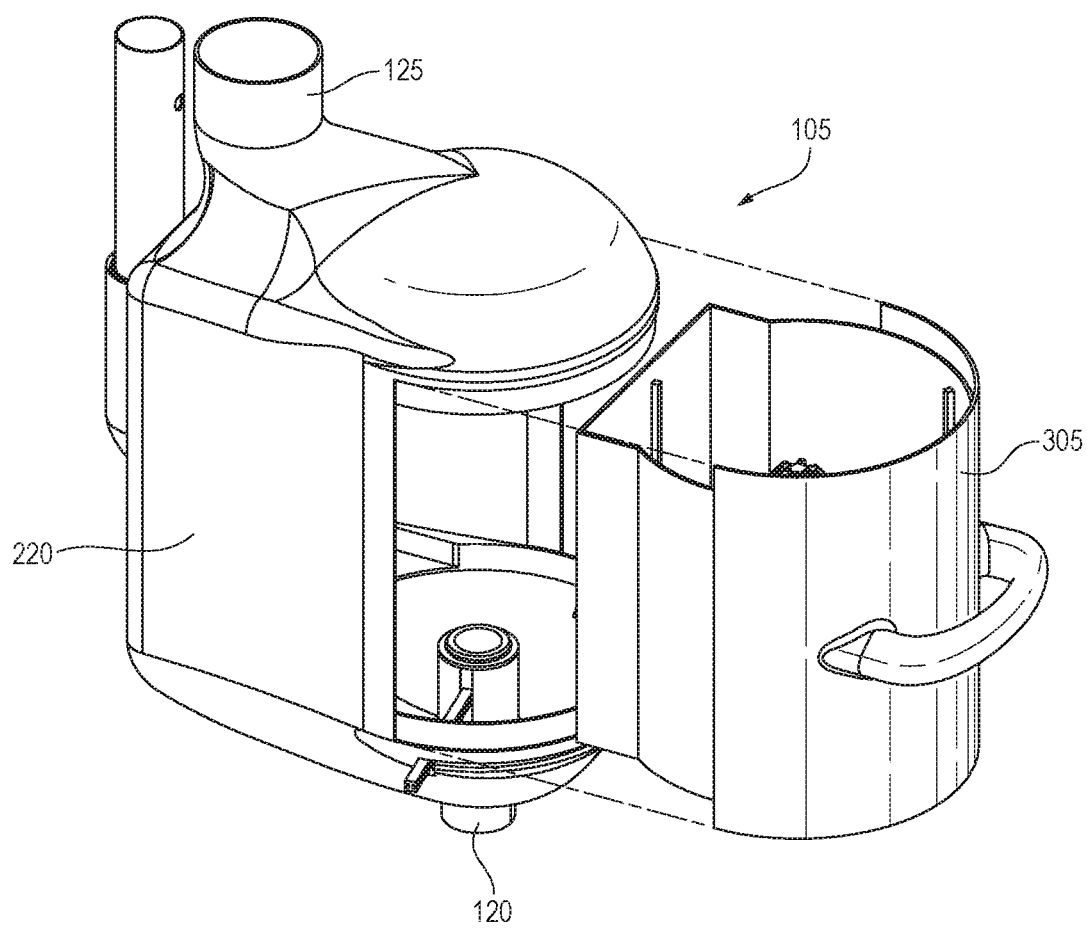
FIG. 3 is a top, side perspective view of an example filter housing as removed from the pool cleaner of FIG. 1.

As can be seen in FIG. 3, at least a portion of housing 220 may be formed by a detachable debris chamber 305. In the example embodiment shown in FIG. 3, the debris chamber 305 forms a front portion of the housing 220, and is removable therefrom. As shown, debris chamber 305 may contain the one or more filters 225. Removal of the debris chamber 305 from the rest of the housing 220 allows for access to the filters 225 for cleaning or replacement thereof. The debris chamber 305 may re-engage with the rest of the housing 220, and a locking mechanism may help prevent accidental removal thereof. Such locking mechanisms are well-known in the art, and may comprise a latch or the like. It will be understood that a detachable debris chamber 305 may not be included, such that the housing 220 is mostly or entirely self-contained.

The concept of pre-swirl will now be discussed. Pre-swirl occurs when water within the filter unit 105 begins to swirl in the same direction as the impeller 230 is spinning. Pre-swirl is therefore a spiral effect. In many prior art devices, pre-swirl was considered a negative. When water within the housing 220 of the filter unit 105 begins to swirl in the same direction as the impeller 230 is spinning, a reduction in head pressure can occur. This can be highly problematic in many prior art systems, because less head pressure means a reduction in the height to which water can be pumped. This is especially problematic for cleaners that attach to a pool's pump system because they may completely lose suction due to pressure losses However, in an example embodiment of a pool cleaner 100, a large amount of head pressure is not needed for proper vacuum performance. Head pressure sufficient only for water to reach the outlet of the cleaner is enough for proper operation. Rather, a high flow rate is more beneficial to vacuum performance. As the primary downside of pre-swirl becomes less of an issue, the benefits of pre-swirl become valuable. For example, when water is already swirling in the same direction as the impeller 230, there is less drag on the impeller 230. When there is less drag on the impeller 230, less current is drawn from the battery/batteries 240. The overall runtime of the pool cleaner 100 can thereby be increased, due to the lighter load on the battery/batteries 240.

Figure 4:
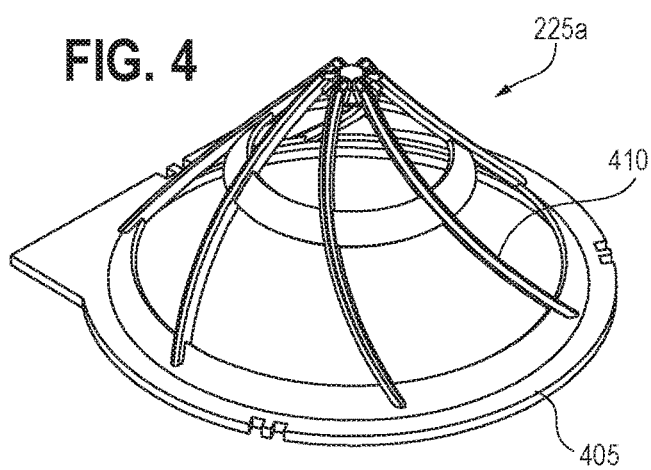
FIG. 4 is a top perspective view of a first spiral rib filter having two notches in its peripheral base.

Several different embodiments may be employed that incorporate a flow conditioning element designed to reduce current usage, including but not limited to a pre-swirl mechanism for generating pre-swirl, either alone or in combination. As a non-limiting example, pre-swirl may be caused at least in part by the structure of a filter 225. As shown in FIG. 4, a filter 225A may include a base plate 405, from which a plurality of spiral arms 410 extend. Each spiral arm 410 may have an arcing shape. When each of the spiral arms 410 arc in the same direction, water passing through the filter may be directed to swirl within the housing 220.

Figure 5:
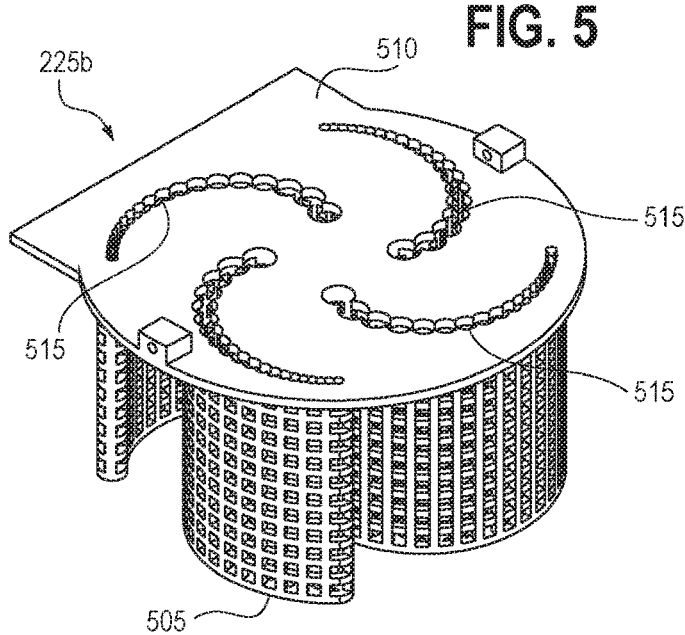
FIG. 5 is a top perspective view of another example filter assembly.
Figure 6:
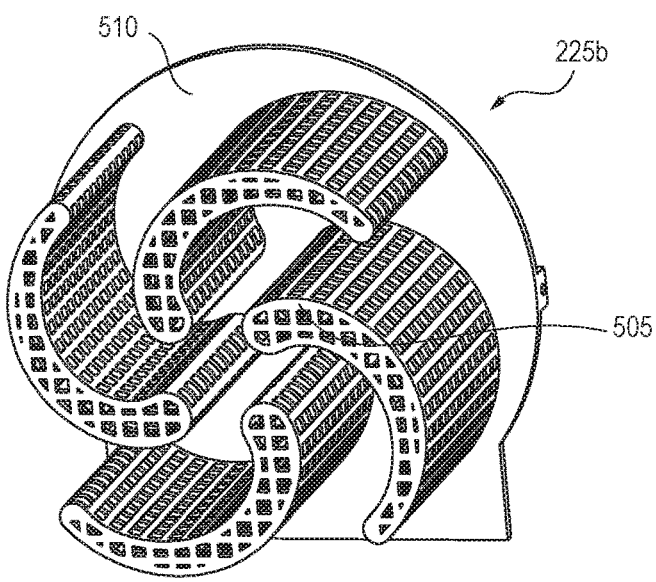
FIG. 6 is a bottom perspective view the filter assembly of FIG. 5.

Similarly, as a non-limiting example and as shown in FIGS. 5 and 6, other filter structures may also aid in generating pre-swirl within the housing 220. The spiral shape of the filter 225B in FIGS. 5 and 6 have a spiral pattern to the blades 505 that extend from the base plate 510. Each blade 505 spirals outwardly, and decreases in thickness as it gets further from the center of the base plate 510. The base plate 510 itself includes a series of through-holes 515 that follow the arc of each blade 505. As the water passes into a blade 505, it is forced through the holes 515 associated with that respective blade. As will be understood in the art, when the same amount of water flows through each hole, the holes with the smaller diameter will have a higher flow velocity (and larger kinetic energy). As energy must always be conserved, the water at the smaller holes will have a lower pressure, whereas the larger diameter holes will have a slower flow velocity (less kinetic energy) and therefore a higher pressure. After passing into the blade 505, water will flow from the largest holes to the smallest holes, due to the pressure difference. Due to the pattern of holes 515 in the baseplate 510, the water flowing out of the filter 225B will follow a rotational a swirling path outwards. Other filter structures are also envisioned for generating pre-swirl.

Figure 7:
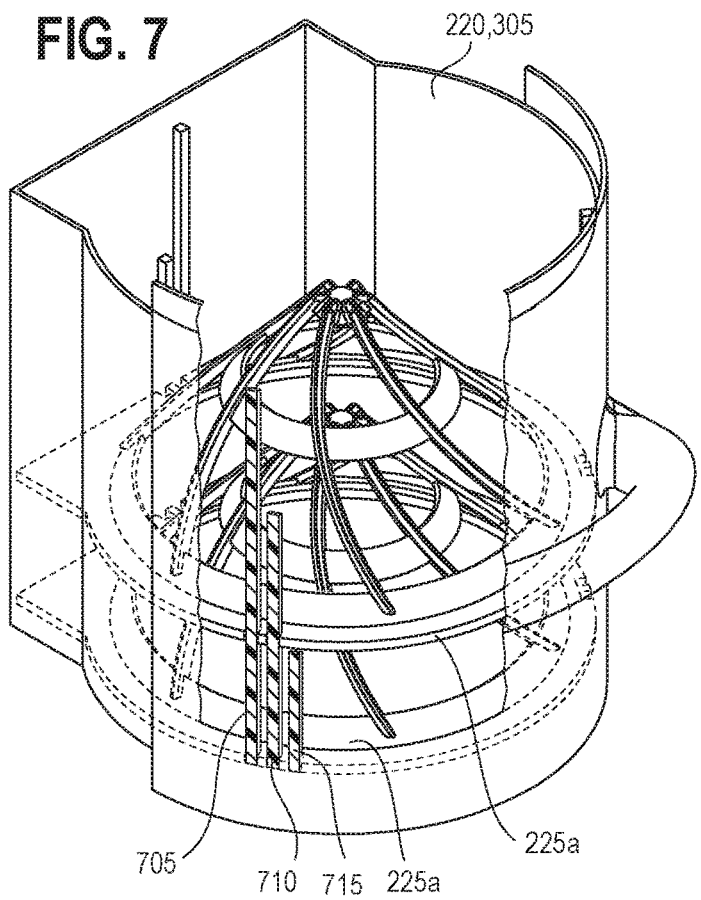
FIG. 7 is a section view of a filter housing illustrating first and second spiral rib filters positioned therein.

It will be understood that multiple filters 225, either in series or in parallel within the housing 220, may be used. For example, as shown in FIG. 7, a first spiral arm filter 225A and a second spiral arm filter 225A may be used in series. The second spiral arm filter 225A may be a finer filter 225 than the first spiral arm filter 225A. Any subsequent filters 225 may similarly be finer than the second spiral arm filter 225A. This arrangement prevents pressure build up from large debris clogging finer filters. By using sequential filters 225 that each help to induce pre-swirl within the housing 220, an enhanced pre-swirl condition may be created.

Other types of filters may also be used for similar purposes, such as cartridge filters, cylinder filters, sponge filters, grate filters and the like. As are known in the art, cartridge filters may contain layers of microfiber woven thread to filter out microscopic debris, and can be coated with diatomaceous earth (DE) powder for even finer filtering. Cone filters may have a woven filter bag stretched over the outside for filtering medium sized debris such as broken pieces of leaves and dirt. Sponge filters containing different pore sizes for different sized debris may be used, typically for dirt and smaller debris. Filter grates may be used that have large openings to allow medium sized and smaller debris to pass while filtering larger debris. Such filters may all be used in the housing 220, as discussed above and below. A variety of materials may be used for such filters, depending on the intended level of filtration. These materials could include, but are not limited to: standard woven filter bag material, finer sand and silt mesh material, microfiber woven strands in layers, DE (diatomaceous earth) powder coating, carbon based filtration, membranes, or magnetic filtration.

Figure 8:
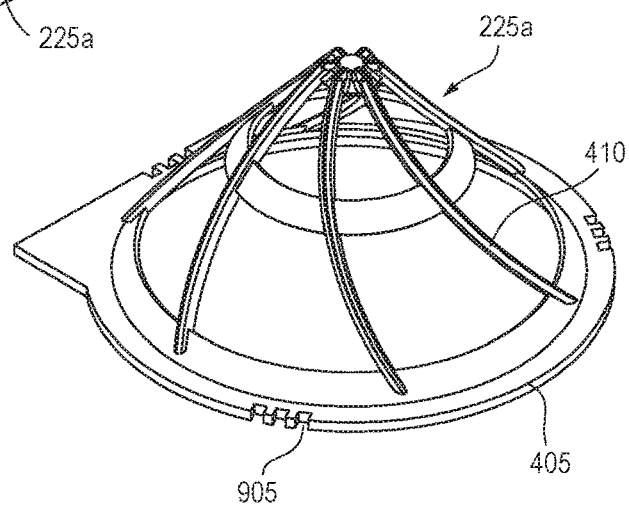
FIG. 8 is an elevation view in section taken of a portion of the filter housing.

FIGS. 7 and 8 illustrate a filter placement structure for housing 220 and filters 225 to help with properly ordering the filtering abilities of each sequential filter 225. As shown in FIGS. 7 and 8, the housing 220 may include a series of vertical bars. The longest bar 705 extends much of the way up the height of the housing 220. The middle bar 710 extends approximately halfway up the height of the housing 220. The shortest bar 715 extends only slight up the height of the housing 220.

Figure 9:
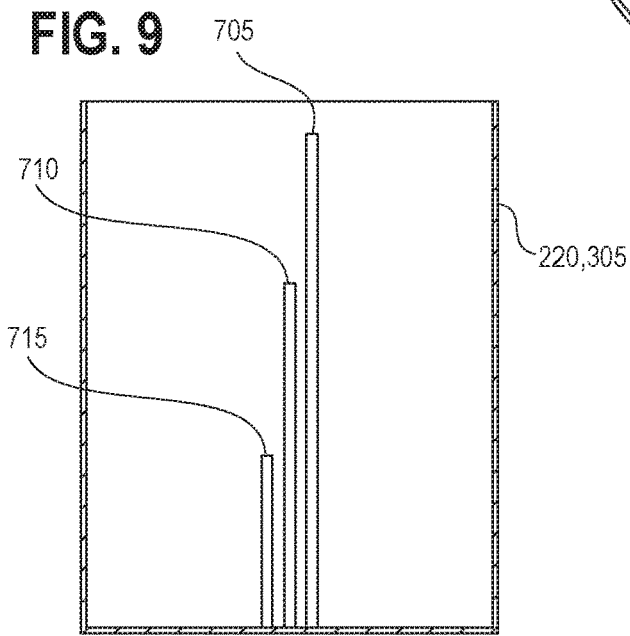
FIG. 9 is a top perspective view of a spiral rib filter having three notches in its peripheral base.

The spiral arm filter 225 of FIG. 9 includes a corresponding set of notches 905 in the base plate 405. The number of notches 905 in the base plate 405 determines the position, within the housing 220, into which the filter 225A can be placed. For example, as shown in FIG. 9, the base plate 405 of the filter 225A includes three notches 905. As the filter 225A is lowered into the housing 220, a first notch 905 can receive the longest bar 705 therein. The filter 225A can therefore be lowered, where a second notch 905 can receive the middle bar 710 therein. The filter 225A can therefore be lowered, where a third notch 905 can receive the shortest bar 715 therein. Due to the presence of three notches 905, the filter 225A can therefore be positioned all the way to the bottom of the housing 220.

However, a filter 225A with only two notches 905 (such as the filter 225A of FIG. 4) could not be positioned lower in the housing 220 than the top of the shortest bar 715. The longest and middle bars 705, 710 could be accommodated within the two notches 905, as will be understood. However, the top of the shortest bar 715 would contact the base plate 405 (due to the lack of a third notch), thereby preventing the two-notch filter 225A from being lowered any farther. Similarly, a filter 225A with only a single notch 905 could not be positioned lower in the housing 220 than the top of the middle bar 710, for reasons akin to those discussed above.

Thus, filters 225 of a given porosity may be manufactured with a given number of notches, thereby helping with the positioning of such filters 225 in proper sequential order within the housing 220 (e.g., most coarse to most fine). It will be understood that different lengths and shapes of bars 705, 710, 715 could be used. In addition, other structures are envisioned for accomplishing the same goal. Such a keying system may be achieved in a number of different ways. For example, walls on filter components could be extruded, or the filter housing 220 could be conically-shaped to accommodate filters of different diameters at different locations. Further, one or more of such filters 225 may be structured to help generate pre-swirl, as discussed above.

Other placement structures are envisioned. For example, by making the filter housing 220 conically shaped, filters 225 could have varying diameters based on their level of porosity. Therefore, a filter 225 could only fit within the housing 220 where the diameter of the filter 225 and housing 220 correspond. In such an embodiment several different locking mechanisms could be used, including but not limited to: screw threading, twist lock, or snap fitting features.

Yet another embodiment can also be envisioned wherein the filter housing 220 uses a hinge, or similar device, to allow for selective opening thereof. The filter housing 220 would therefore have shelves, pins, or other locking features at varying heights within the filter housing to securely hold filters 225 once the housing is selectively secured in a closed position. Certain keying features could be included in the housing to ensure filters 225 are placed in order of decreasing porosity, although such keying features should not be considered limiting.

The design of the filters 225 could also be considered as placement structures. By including extruded walls on the filters 225, which are designed to contact the next filter 225, filters 225 could be stacked within the filter housing 220 without the need for placement structures within the filter housing 220. However, it will be understood that placement structures could still be used within the filter housing to ensure filters are placed in order of decreasing porosity.

Figure 10:
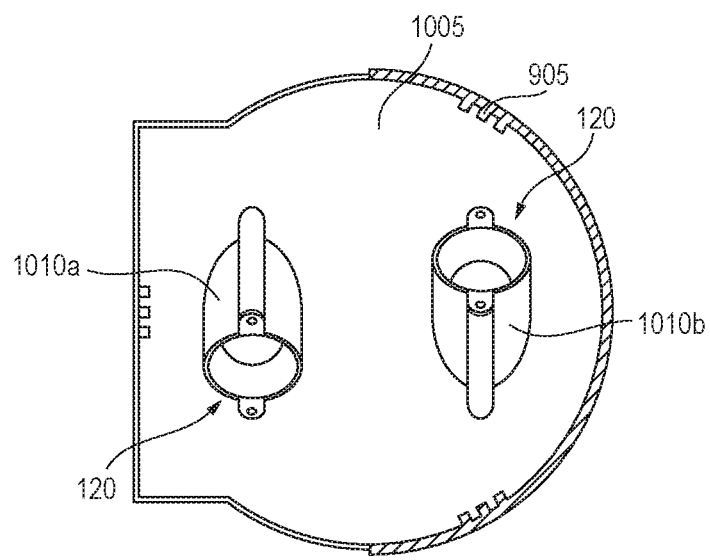
FIG. 10 is a top perspective view in section of the bottom of the filter housing showing two incline inlets.

Pre-swirl may also be generated within the housing 220 by other mechanisms. As a non-limiting example, FIG. 10 illustrates a base wall 1005 of the housing 220, according to an example embodiment. As shown, the base wall 1005 includes at least one filter unit inlet 120. Two inlets 120 are shown in FIG. 10. Each filter unit inlet 120 is positioned radially outwardly from the center of the base wall 1005, and each may include a nozzle 1010. A first nozzle 1010A is pointed in a direction opposite that of the second nozzle 1010B. As will be understood, as water is pumped through such nozzles 1010, water enters the housing 220 on either side of the housing 220 moving in opposite directions. This creates a swirling effect within the housing 220. It will be understood that a single filter unit inlet 120 could be used to effect such swirling as well. Additionally, one or more inlets 120 could be placed elsewhere to help generate pre-swirl, such as tangentially along the sides of the housing 220 with inflow being directed with azimuthal velocity around the housing 220. Also, the concept of using different inlet sizes (discussed above) can be employed to create a swirling motion into the filter chamber.

Figure 11:
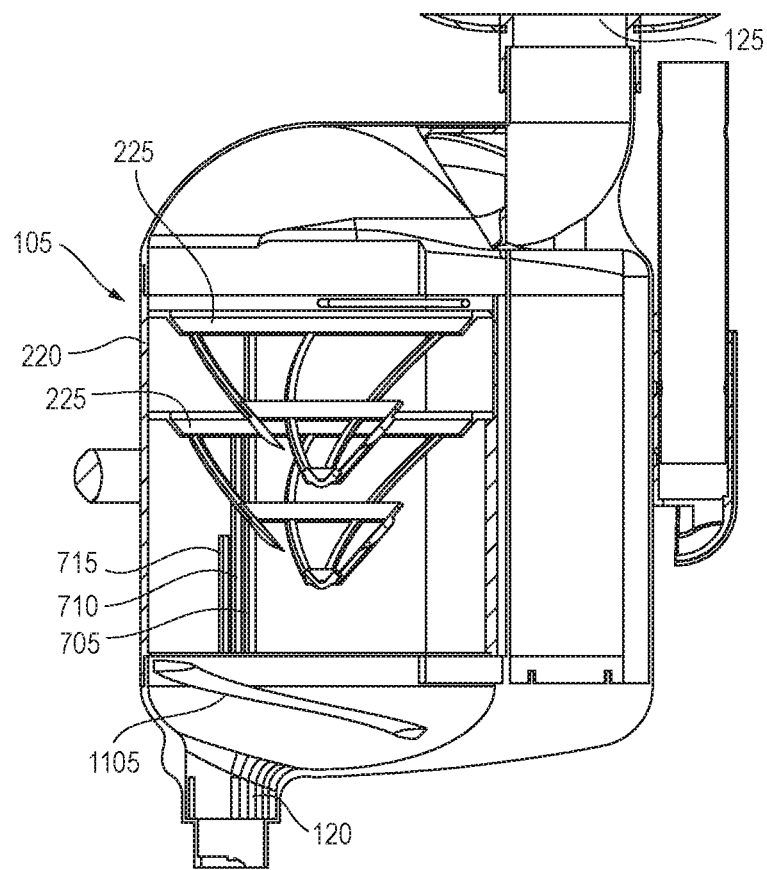
FIG. 11 is an elevation view in section taken of the filter housing.

In addition to placement and angling of one or more inlets 120 and their corresponding nozzles 1010, the structure of housing 220 may be used to help generate pre-swirl. As a non-limiting example, FIG. 11 illustrates an example embodiment of a housing 220 in which one or more spiral ridges 1105 are positioned on an inner wall of the housing 220. Water pumped into the housing 220 encounters the one or more spiral ridges 1105, and begins to swirl in the intended direction. As will be understood, angled ribs, vanes or ducts could be used in various locations within the pool cleaner 100. For example, pre-swirl assisting structures may be provided: (a) within the housing 220 in the vicinity of the inlet(s) 120, as discussed above; (b) within the housing 220 along inner walls in an area preceding the filters 225; (c) within the filters 225A, as discussed above; (d) within the housing along inner walls in an area containing the filters; (e) within filter unit along inner walls in an area preceding the impeller; and/or (f) downstream of the filters 225 but upstream of the impeller 230. Adding spiral ribs along any portion of the filter chamber or its entire length can direct and aid the flow of water into a swirling motion. The ribs will block nearly all axial velocity and direct the flow instead into an azimuthal direction. Alternatively or in addition, a pre-swirl insert with such spiral ridges 1105 can be placed before the impeller 230 to help generate pre-swirl. Any such ribs could be selectively insertable and removable components.

Figure 12:
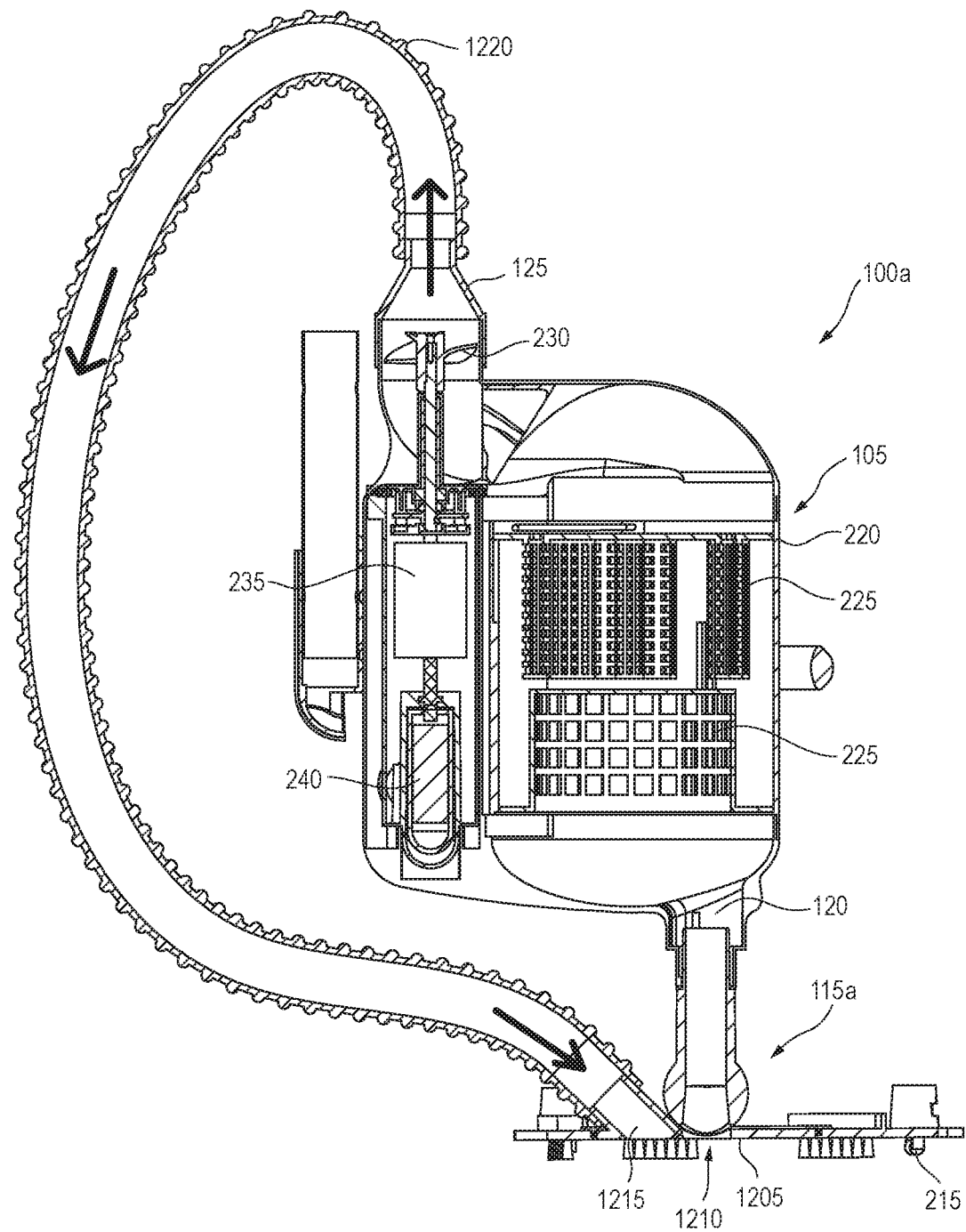
FIG. 12 is a side elevation view taken in cross-section of an alternative embodiment of a manually operated pool cleaner.

In addition to generating pre-swirl, other flow conditioning elements for lessening the current draw caused by the impeller 230 may be used. FIG. 12 illustrates an example embodiment of an alternative pool cleaner 100A. Like the pool cleaner 100 discussed in detail above, pool cleaner 100A includes a filter unit 105 including a housing 220 that contains filters 225. Water flows into the housing 220 through a filter unit inlet 120, and out from the housing 220 through an outlet 125. An impeller 230, a motor 235, and a battery 240 are all included as well. However, in place of vacuum head 115 is modified vacuum head 115A.

Vacuum head 115A includes a body 1205, which contains a vacuum head inlet 1210 extending therethrough. The vacuum head inlet 1210 is in fluid communication with the filter unit inlet 120, as in the pool cleaner 100. However, vacuum head 115A includes a recirculation port 1215, which is in fluid communication with a recirculation conduit 1220. The recirculation conduit 1220 is also in fluid communication with the outlet 125, in place of the filter bag 110 discussed above in connection with pool cleaner 100. Thus, at least a portion of the exhausted water flow is recirculated down to the vacuum head 115A. The additional flow of water beneath the vacuum head 115A creates additional pressure thereunder, which in turn helps to force water into the filter unit inlet 120. By assisting the flow of water into the filter unit inlet 120, the amount of current drawn by the motor 235 to drive the impeller 230 is lessened. In addition, such positioning of the recirculation port 1215 causes any debris not picked up from suction through the first vacuum head inlet 1210 will be pushed into the vacuum head inlet 1210 by the recirculation flow through the recirculation port 1215.

Figure 13:
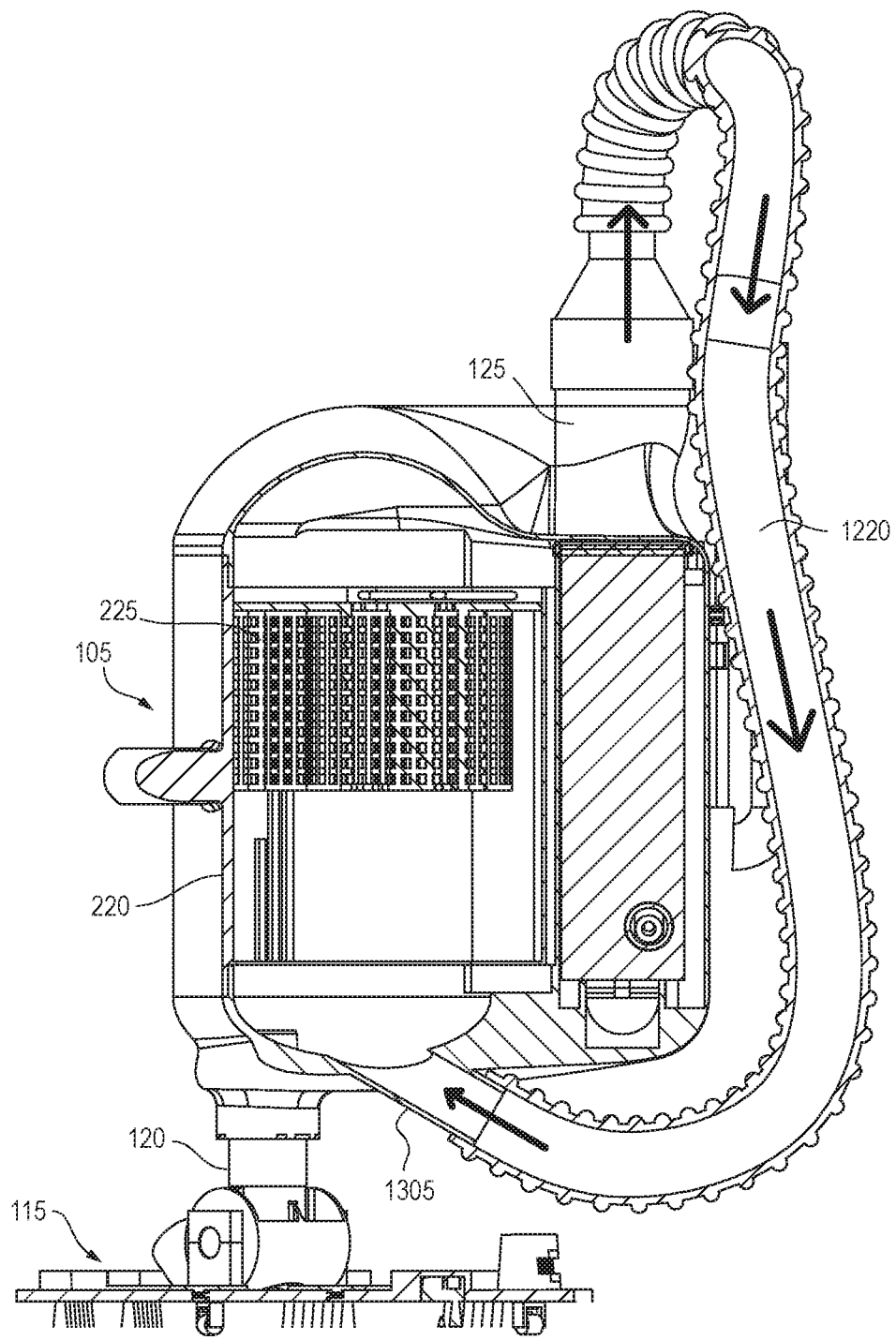
FIG. 13 is a side elevation view taken in cross-section of another alternative embodiment of a manually operated pool cleaner.

A recirculation of at least a portion of the exhaust flow could also be used to generate pre-swirl, as in FIG. 13. The recirculation conduit 1220 may engage with a secondary inlet 1305 of the filter housing 220, such that the vacuum head 115 of FIG. 1 may be used. Secondary inlet 1305 allows exhausted water to flow directly into the housing 220. A base wall for the housing 220 similar to the base wall 1005 of FIG. 10 may be used. One filter unit inlet 120 of the base wall 1005 (of FIG. 10) may be in communication with the vacuum head 115 as per embodiments discussed above. The second filter unit inlet 120 of the base wall 1005 (in FIG. 10) may be the secondary inlet 1305, and may therefore be in communication with the recirculation conduit 1220. Inflow from the vacuum head 115 may therefore be directed in a direction opposite that of inflow from the recirculation conduit 1220 to assist with creation of pre-swirl. Other constructions are also envisioned, as will be understood.

Figure 14:
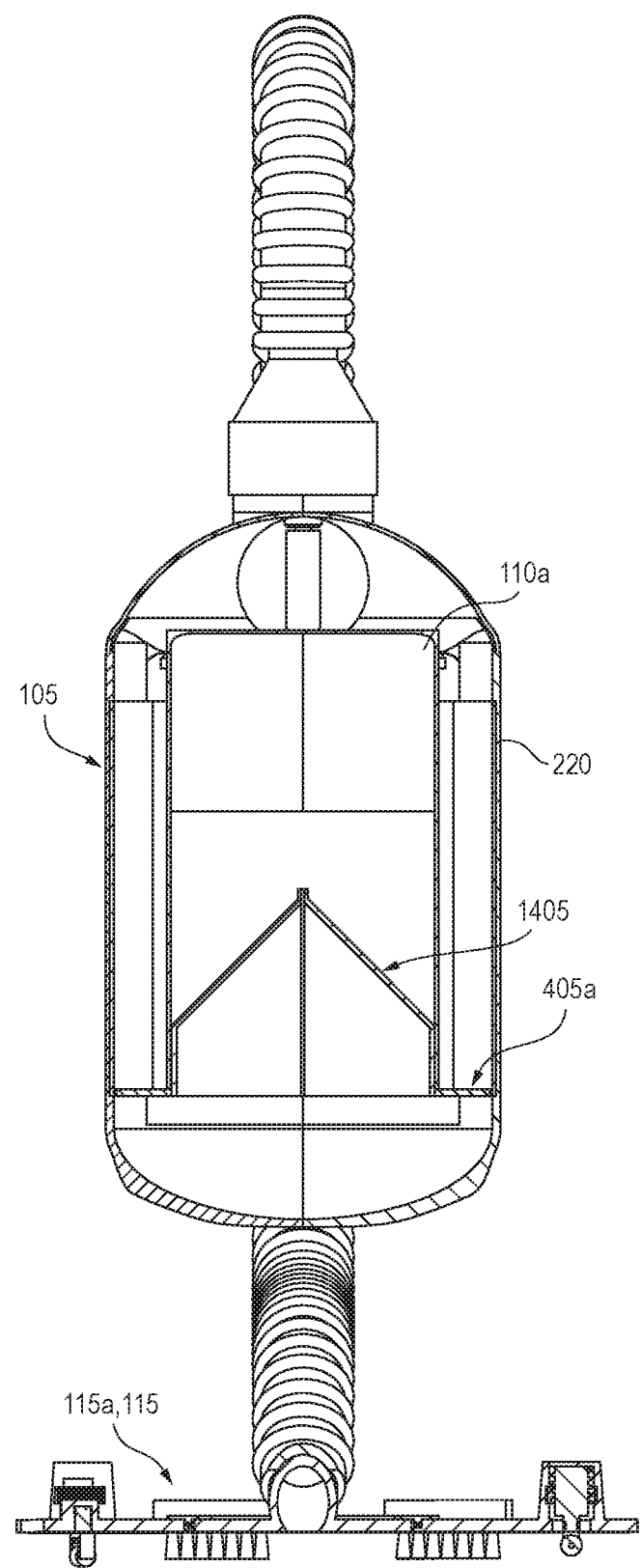
FIG. 14 is a front elevation view taken in cross-section of an alternative embodiment of a manually operated pool cleaner having a duckbill filter therein.
Figure 15:
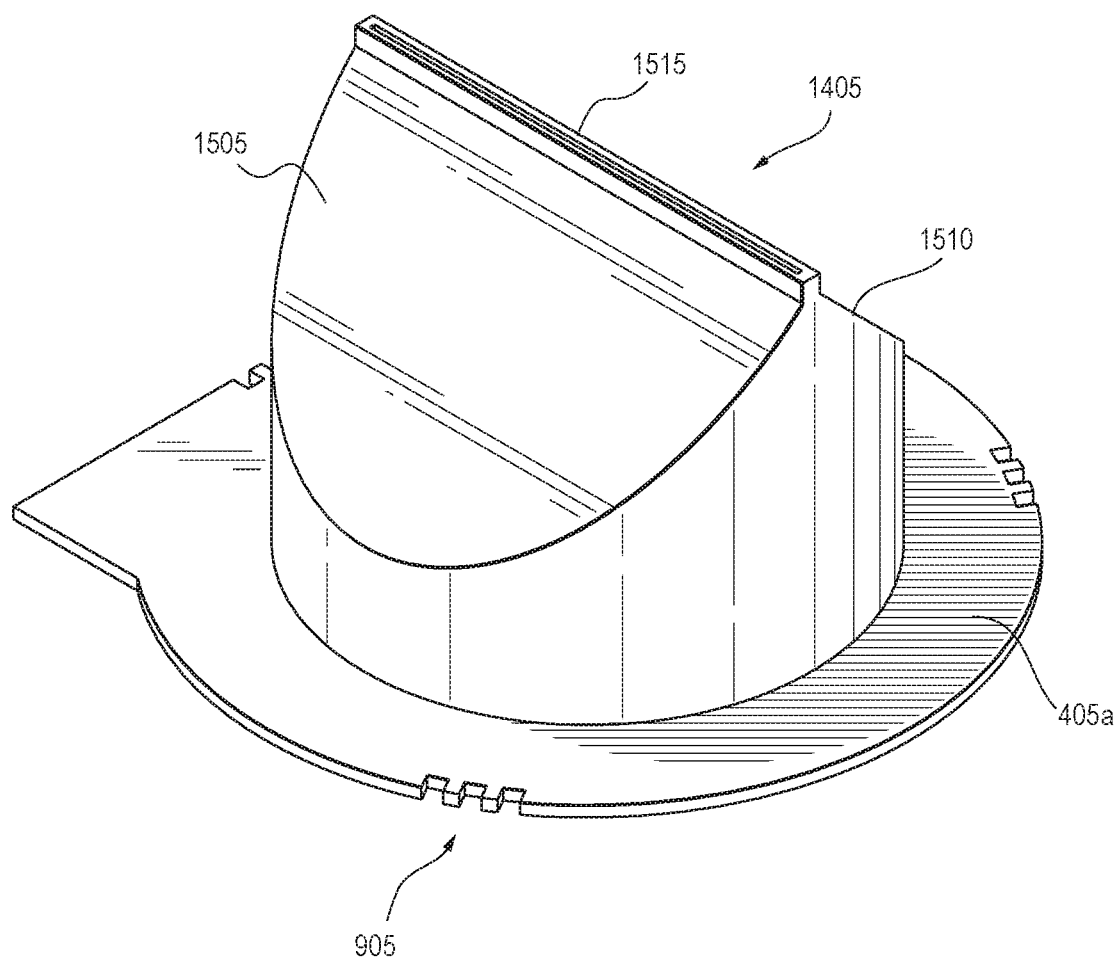
FIG. 15 is a perspective view of a duckbill valve as part of a filter, having three notches in its peripheral base.

In one or more alternative embodiments, one or more filter bags 110A may be positioned internally within housing 220. As shown in FIG. 14, an internal filter bag 110A is positioned within the housing 220 of the filter unit 105. Filter bag 110A may include a base plate 405A. In the embodiment shown in FIG. 14, the filter bag 405A includes a duck bill valve 1405 integrated therein. The duck bill valve 1405 is a one-way valve designed to allow inflow from the filter unit inlet 120 into the filter bag 405A, but prevent the water from exiting the filter bag 405A without being filtered. FIG. 15 illustrates the duck bill valve 1405 and mounting plate 405A separated from the filter bag 110A. The duck bill valve 1405 includes opposing angled lips 1505, 1510 with an opening 1515 therebetween.

When water is pumped into the housing 220, the water is forced up through the duck bill valve 1405. The incoming pressure of the inflow on the underside of the opposing angled lips 1505, 1510 forces the lips 1505, 1510 apart, allowing the inflow to pass through the opening 1515. However, when inflow pressure stops or drops sufficiently that backflow may occur, such backflow exerts pressure on the topside of opposing angled lips 1505, 1510, thereby forcing the lips 1505, 1510 together. Duck bill valve 1405 thereby closes to prevent backflow. It is further noted that the duck bill valve 1405 within the housing 220 may similarly help with creation of pre-swirl, depending on the location and angling of the opening 1515. The use of duck bill valve 1405 should not be seen as limiting, as other valves are envisioned.

Figure 16:
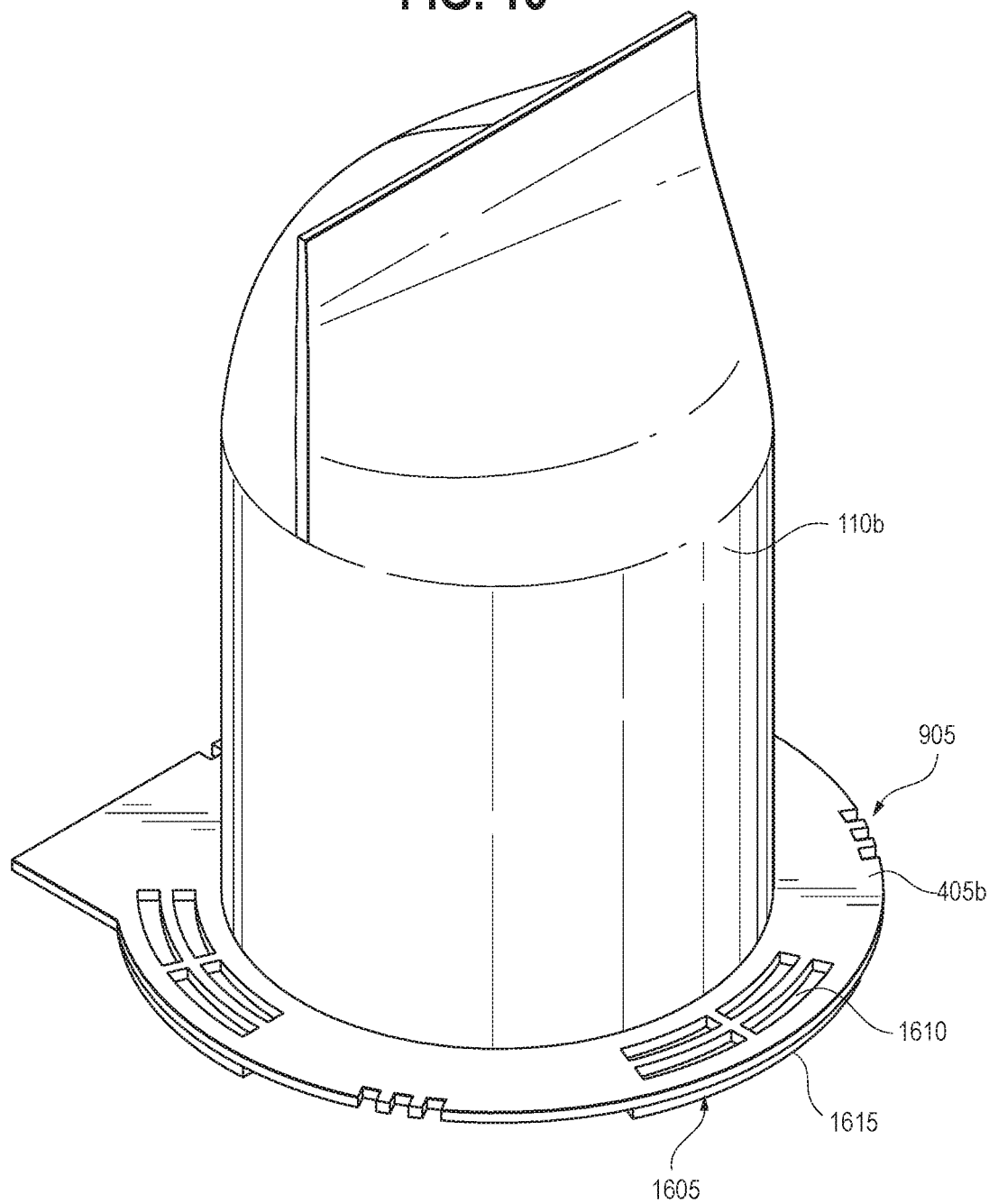
FIG. 16 is a top perspective view of a filter utilizing a quick-drain valve.
Figure 17:
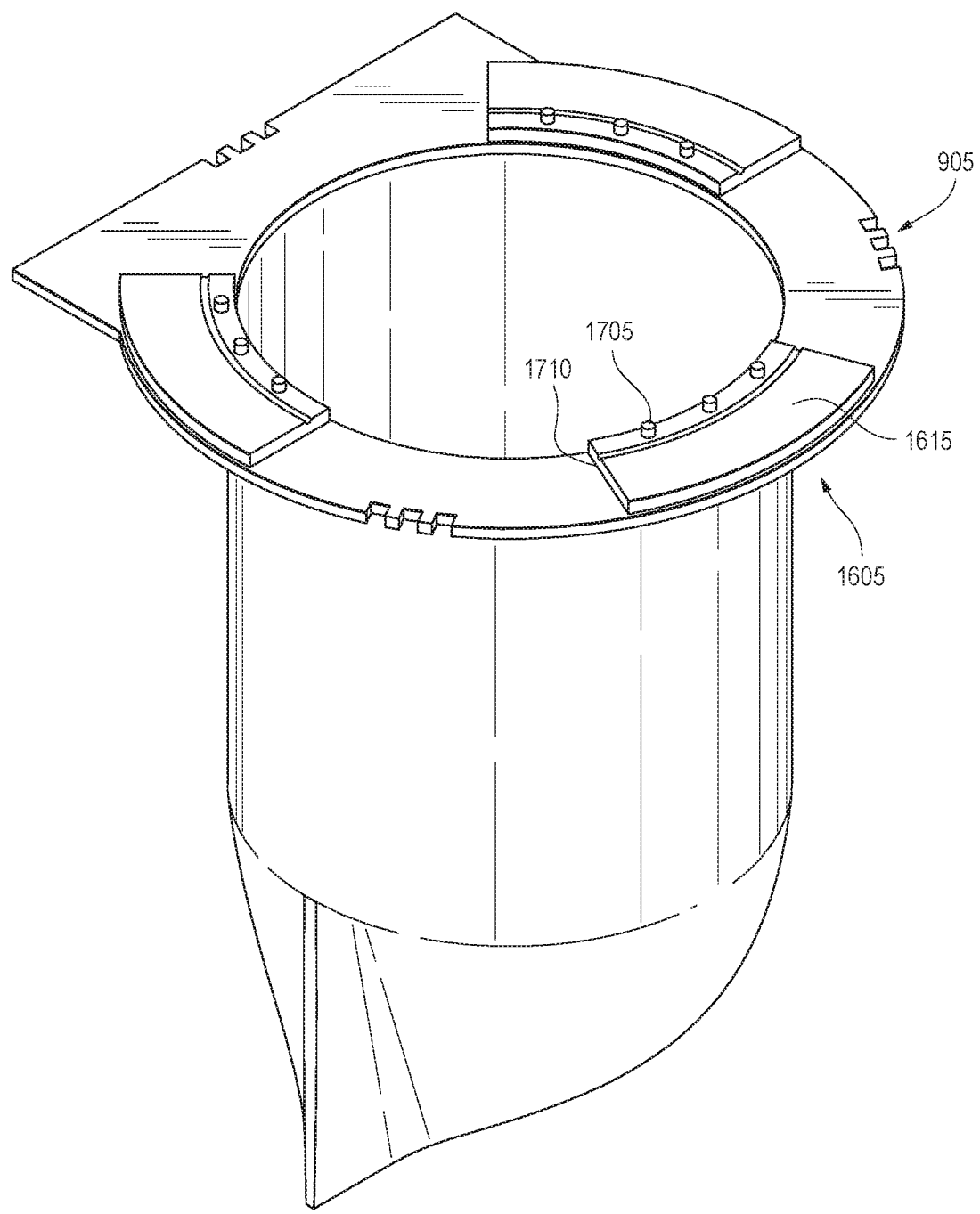
FIG. 17 is a bottom perspective view of the filter of FIG. 16.

FIG. 15 also illustrates that the base plate 405A may be similar to the base plates 405 discussed above. For example, the base plate 405A may include notches 905 or other structure for assisting in the positioning of the filter bag 110A within the housing 220. However, other constructions for a base plate 405 are also envisioned. For example, as shown in FIGS. 16 and 17, a base plate 405B may include one or more quick drain valves 1605. A quick drain valve 1605 may include one or more drain openings 1610 extending through the thickness of the base plate 405B, as well as a flap 1615 positioned beneath the drain openings 1610. As best seen in FIG. 17, the flap 1615 may be secured to the base plate 405B by one or more connectors 1705, such as pins or screws. A living hinge 1710 or other structure that allows flexing of the flap 1615 is positioned along the flap 1615.

When water flows up into the filter bag 110B (from the perspective of FIG. 16), the upward water pressure forces each flap 1615 against its respective drain opening(s) 1610, thereby closing the quick drain valve(s) 1605. However, when inflow ceases (or the device is removed from water or the like), water within the housing 220 can escape up (from the perspective of FIG. 17) through the drain openings 1610 and out of the unit through dedicated channels to prevent mixing with unfiltered water. The escaping water forces the flap(s) 1615 away from the drain openings(s) 1610, thereby opening the quick drain valve 1605. It is noted that quick drain valves 1605 may be present on any base plate 405 discussed herein or otherwise.

Figure 18:
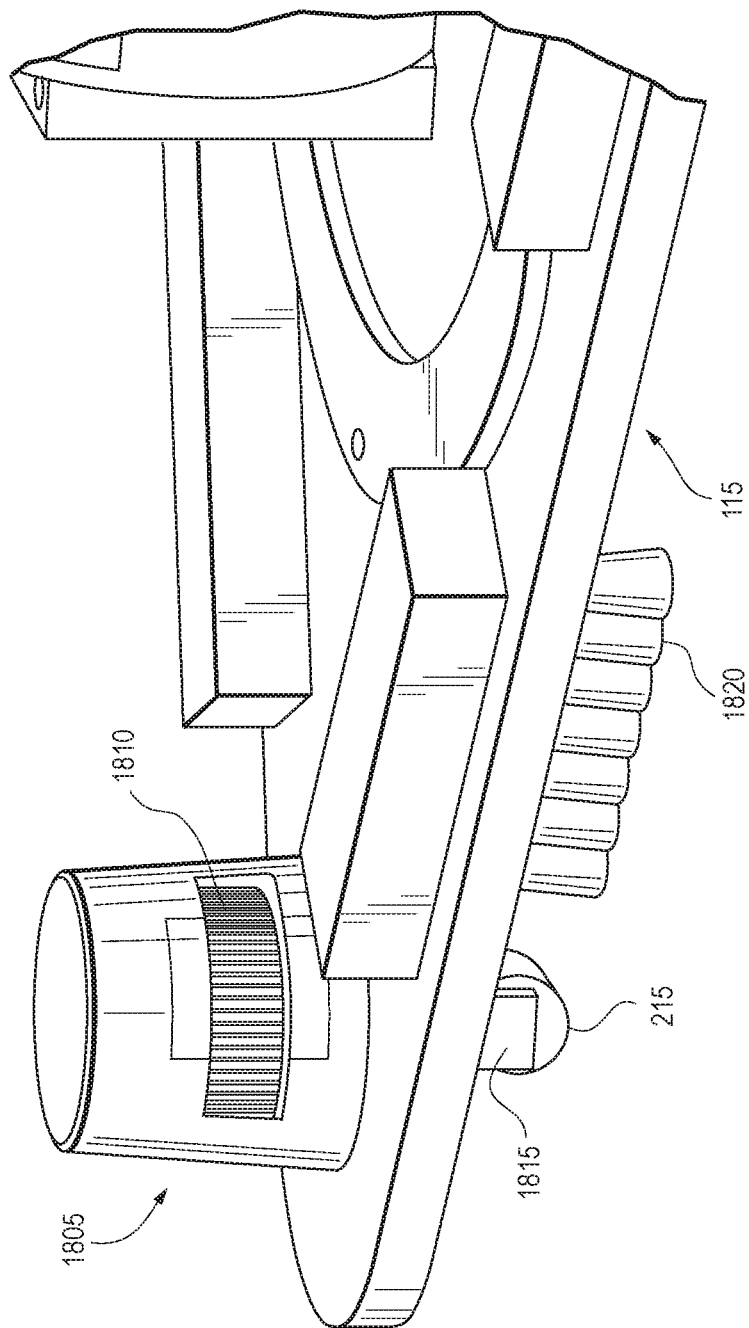
FIG. 18 is a top perspective view of an example embodiment of a vacuum head.
Figure 19:
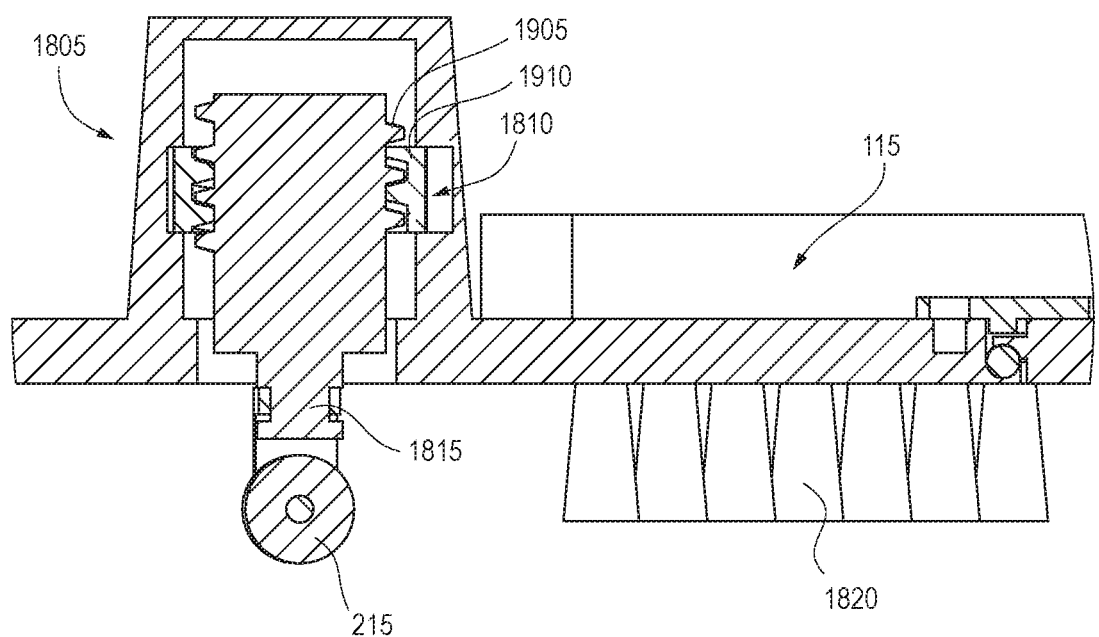
FIG. 19 is a side elevation view in cross-section of the vacuum head of FIG. 18.

In another example embodiment, vacuum head 115 may be adjustable in height above the ground. As shown in FIGS. 18 and 19, vacuum head 115 may include one or more height adjustment assemblies 1805. A height adjustment assembly 1805 may include an adjustment knob 1810 that can be turned to raise or lower a shaft 1815. At the end of the shaft 1815 is a wheel 215 or other roller device (such as a caster) that allows for movement. One or more brushes 1820 or other cleaning devices may extend downwardly from the vacuum head 115.

As shown in FIG. 19, the shaft 1815 includes threads 1905 that engage with corresponding threads 1910 on the adjustment knob 1810. Turning the adjustment knob 1810 thereby causes the shaft 1815 to screw upwardly or downwardly, thereby raising or lowering the height of the vacuum head 115. Thus, the brushes 1820 or other cleaning devices (including the vacuum head inlet 210) may be raised away from or lowered toward the surface to be cleaned. Similar adjustment assemblies 1805 may be positioned elsewhere on the vacuum head 115. In addition, other structures may be used for selectively raising and lowering the height of the vacuum head 115.

Although the best modes for carrying out the present invention have been described in the foregoing detailed description and illustrated in the accompanying drawings, it will be understood that the invention is not limited to the embodiments enclosed, but is capable of numerous rearrangements, modifications and substitutions of steps and elements without departing from the spirit of the invention. Accordingly, the present invention is intended to encompass such arrangements, modifications and substitutions of steps and elements as fall within the scope of the claims.

The invention claimed is:

1. A submersible water filtration apparatus for filtering water in a body of water comprising:
   a filter unit including:
      a filter housing defining a chamber therein;
      a filter unit inlet in fluid communication with the chamber of the filter housing; and
      a filter unit outlet in fluid communication with the chamber of the filter housing;
   at least one water filter positioned within the chamber of the filter housing;
   a recirculation outlet positioned within the body of water, proximate to the apparatus inlet such that water discharged from said recirculation outlet is expelled into the body of water toward the apparatus inlet before at least some of the water discharged from said recirculation outlet reenters through the apparatus inlet;
   a recirculation conduit allowing fluid communication between the filter unit outlet and the recirculation outlet;
   an electric motor coupled to an impeller, said electric motor and impeller engaged with the filter unit to pump water from the body of water through said filter unit inlet, through said at least one water filter, through said filter unit outlet, through said recirculation conduit, and discharge filtered water out of an outlet.

2. The water filtration apparatus of claim 1 further comprising a vacuum head, the vacuum head including:
- a vacuum head inlet in fluid communication with the filter unit inlet; and
- a recirculation outlet, wherein the recirculation outlet is the outlet from which filtered water is discharged.

3. A submersible water filtration apparatus for filtering water in a body of water comprising:
- a vacuum head having one or more than one height adjustment assembly for adjusting a height of the vacuum head among a plurality of height positions;
- a filter unit including:
  - a filter housing defining a chamber therein;
  - a filter unit inlet extending from the vacuum head and in fluid communication with the chamber of the filter housing; and
  - a filter unit outlet in fluid communication with the chamber of the filter housing;
- an electric motor coupled to an impeller, said electric motor and impeller engaged with the filter unit to pump water from the body of water through said filter unit inlet and discharge filtered water out of said filter unit via the filter unit outlet; and
- a power source for supplying an electrical current to the electric motor.

4. The water filtration apparatus of claim 3, wherein the height adjustment assembly includes an adjustment knob engaged with a selectively moveable shaft to increase or decrease the height of the vacuum head.

* * * * *

UNITED STATES PATENT AND TRADEMARK OFFICE
CERTIFICATE OF CORRECTION

PATENT NO. : 10,625,188 B2
APPLICATION NO. : 16/108837
DATED : April 21, 2020
INVENTOR(S) : Guy Erlich et al.

It is certified that error appears in the above-identified patent and that said Letters Patent is hereby corrected as shown below:

In the Specification

In Column 4, Line 27, delete "indude" and replace with -- include --

Signed and Sealed this
Twentieth Day of July, 2021

Drew Hirshfeld
*Performing the Functions and Duties of the
Under Secretary of Commerce for Intellectual Property and
Director of the United States Patent and Trademark Office*